June 16, 1942.　　　E. MITTELMANN　　　2,286,499
RECTIFIER
Filed Dec. 2, 1940
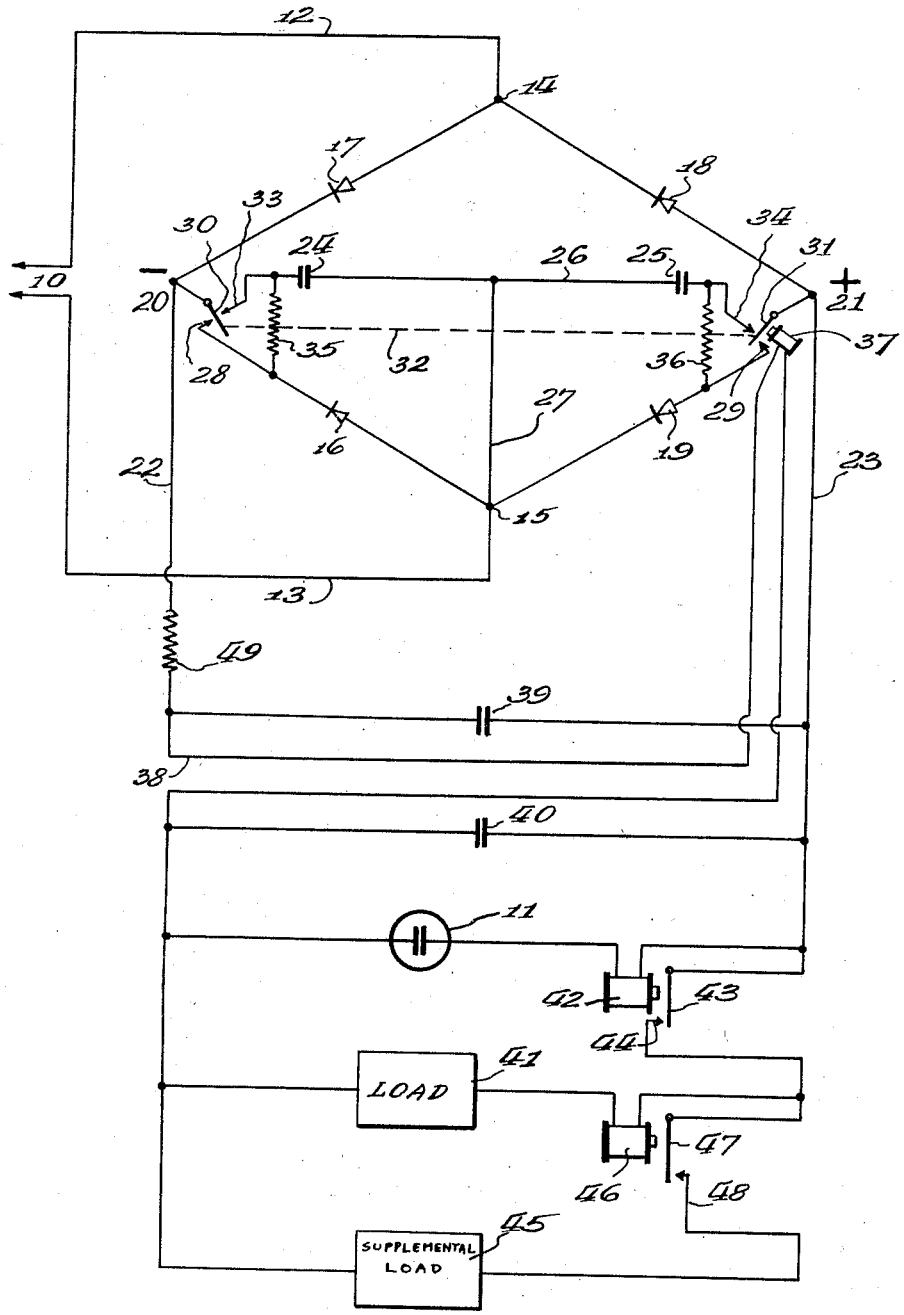
Inventor:
Eugen Mittelmann
By Maurice S. Cayne
Atty.

Patented June 16, 1942

2,286,499

UNITED STATES PATENT OFFICE 2,286,499

RECTIFIER

Eugen Mittelmann, Chicago, Ill.

Application December 2, 1940, Serial No. 368,155

12 Claims. (Cl. 175—363)

This invention relates to rectifiers in general and more particularly to a rectifier for converting alternating current to direct current and supplying same at a constant voltage to a direct current load. Collaterally, the invention relates to a novel circuit for initiating and maintaining the operation of a gaseous discharge tube.

It is contemplated in my invention that the stabilization of voltage will be attained by the utilization of a gaseous discharge or the so-called "glow lamp tube" across the load. The gaseous discharge tube has zero impedance and it operates to compensate for voltage fluctuations of the A. C. input and of the load, thus delivering a steady stable voltage in the well known manner.

Gaseous discharge tubes require a much higher voltage to cause them to "fire" or ignite than to cause them to remain in operation. Hence, the usual manner of utilizing a device of this nature is to provide means for subjecting it to the required voltage for ignition from the power source and then reducing the voltage of the power source in some manner after the tube has become ignited. This, of course, necessitates that the power source including the rectifier and the necessary filters to be used with the rectifier be designed to withstand a fifty to one hundred per cent increase over the power finally available at the terminals of the rectifier. Thus the expense of building such equipment is only justified by the fraction of a second it operates at its maximum power while the gaseous discharge tube is being ignited.

By the utilization of a novel circuit, a simple and practical arrangement may be constructed in accordance with my invention which will provide a stabilized rectifier in which the power pack need only supply power at the voltage at which the gaseous discharge tube operates, and hence the load need never be subject to any higher voltage than the operating voltage of the tube. It is an object of the invention to accomplish this purpose.

Another object of this invention is to provide a novel circuit for igniting and maintaining the operation of a gaseous discharge tube.

A further object of the invention is to provide a device which will be safe in operation while supplying a stabilized rectified voltage to a D. C. load.

Another object of this invention is to provide a stabilized rectifier which will not have the load connected thereto until the device is operating at steady state.

Still a further object of this invention is to provide a stabilized rectifier circuit which will operate economically and consist of a minimum of simple parts easily assembled into an efficient instrument.

With the foregoing and other objects in view which will appear as the description proceeds, the invention consists of certain novel features of construction, arrangement and combination of electrical and mechanical parts and elements hereinafter fully described, symbolically illustrated in the accompanying drawing and particularly pointed out in the appended claims, it being understood that the various changes in the form, proportion, size, minor details and arrangements of the various elements of the invention may be made without departing from the spirit or sacrificing any of its advantages.

For the purpose of facilitating an understanding of my invention, I have illustrated in the accompanying drawing a preferred embodiment thereof, an inspection of which, when considered in connection with the following description, my invention, its mode of construction, assembly and operation and many of its advantages should be readily understood and appreciated.

Referring to the drawing, the figure shows diagrammatically, a circuit of a stabilized rectifier embodying therein my new invention.

In simple parlance, my invention consists of a bridge arrangement of rectifying elements designed to operate as a full wave rectifier and connected in a manner whereby alternating voltage applied to the input thereof will be doubled. Switch means operated by a relay is provided whereby the circuit may be readily switched from doubler to straight rectifier at an opportune moment. A gaseous discharge tube is applied across the rectifier and adapted to operate in parallel with a D. C. load. When the power is initiated in the power source, the rectifier arrangement both rectifies and doubles the voltage and applies it to the gaseous discharge tube. The gaseous discharge tube ignites at this high voltage, and the sudden surge of current in the circuit operates a relay which automatically moves switches to change the rectifier-doubler to a straight full-wave rectifier. Thus the voltage across the gaseous discharge tube is reduced to the operating value. The current surge also operates a relay which serves to switch the load into the rectifier circuit, the load having up to this time been disconnected from the rectifier circuit.

Referring to the details of the drawing, the reference character 10 designates the alternating current source from which an alternating voltage is obtained. This source may be a power pack and its operating voltage need only be of the order of that needed to operate the gaseous discharge tube 11. Leads 12 and 13 connect the power source 10 to terminals 14 and 15 of the rectifier bridge to be described.

The rectifier bridge is provided with four arms, each having a rectifying element therein. Said rectifying elements are shown symbolically in the drawing and are designated 16, 17, 18 and 19, and hereinafter the arms will be referred to by the reference character of the element therein. It should be appreciated that the rectifying elements may be any of the well known devices, such as chemical rectifiers, vacuum tubes, mercury arcs, etc. The rectified voltage is taken off from terminals 20 and 21 of the bridge, lead 22 from terminal 20 being the negative side, and lead 23 from terminal 21 being the positive side. A pair of condensers 24 and 25 extend between terminals 20 and 21 of the bridge, and the lead 26 between said condensers is connected to the terminal 15 of the bridge by the conductor 27.

The arms containing the rectifying elements 16 and 19 are electrically connected to the contacts 28 and 29 respectively of a two-pole double acting switch. The elements of the switch are shown in the drawing symbolically for the purpose of clarity, the arms 30 and 31 thereof being operable together as indicated by the broken line 32 connecting same. The other two poles of the switch are designated 33 and 34 and they lead to the condensers 24 and 25 respectively. The other two elements shown in the bridge are a pair of high resistance resistors 35 and 36 connected between the arm 16 and one side of the condenser 24, and between the arm 19 and one side of the condenser 25, respectively.

The double poled two way switch is operated by a relay 37 which is connected into one of the leads 22 at 38. A pair of parallel condensers 39 and 40 are provided across the leads 22 and 23 at various points for filtering the ripple produced in the rectified direct voltage.

The load 41 is connected across the leads 23 and 22 and is intended to utilize the direct voltage obtained from the generator. In parallel with the load 41 is the glow lamp 11 having a relay 42 in series therewith. The operation of the relay 42 will close the arm 43 against the contact 44 and thereby connect the load across the lines 22 and 23. Normally the arm 43 is disconnected from the contact 44.

A safety device is provided to prevent burning out of the glow lamp 11. Said device consists of a supplemental load 45 connected across the leads 23 and 22 in parallel with the load 41. A relay 46 is provided in the connecting wire of the load 41 and said relay actuates the arm 47 removing same from the contact 48 when the load is drawing normal current. Of course, when the load current drops, the relay 46 releases the arm 47 so that it bears against the contact 48 and connects the supplemental load 45 into the circuit.

The operation of the device is as follows:

Normally the relay 42 is "open," i. e., the arm 43 is disconnected from the contact 44 so that the load 41 is not across the leads 22 and 23. In this condition, the glow lamp 11 and the condensers 39 and 40 are in parallel with the bridge, the line 22 having a current limiting resistor 49 in series with the glow lamp 11. Under these initial conditions, the relay 37 is, of course, not energized and the arms 30 and 31 are resiliently held against the contacts 33 and 34 respectively in a manner well known with respect to relays of this type.

With this state of conditions, the bridge is connected as a voltage doubler, the arms 16 and 19 being effectively disconnected from the circuit. The resistors 35 and 36 are of high resistance and serve to leak the charge off the condensers 24 and 25 when said condensers have served their purpose. However, for the purpose of ignition of the glow lamp 41, i. e., while the bridge is acting as a voltage doubler, the resistors 35 and 36 may be disregarded.

An alternating voltage is now supplied from the source 10 and through the leads 12 and 13. On each half cycle of the voltage, the condensers are respectively charged to the peak voltage of the alternating voltage. This occurs in the well known manner, one condenser being charged on one half cycle through either arm 17 or arm 18, depending on the directional properties of the rectifier elements, and one condenser being charged on the next half cycle through the lead 27 from the terminal 15. Since the condensers 24 and 25 are connected in series, the voltage across them, namely across points 20 and 21, or between the leads 22 and 23, will be twice the peak alternating voltage supplied from the power source 10.

The load 41 and the supplemental load 45 at this stage are not connected across the line 22 and 23 since as has been explained, relay 42 is "open." As soon as the voltage across the line 22 and 23 reaches the voltage necessary to ignite the glow lamp 11, which may be of the order of twice the operating voltage thereof, the circuit through the glow lamp 11 will be completed from line 22 to line 23, and there will be a surge of current in the D. C. circuit, limited only by the current limiting resistor 49. The current will at the same time flow through the coils of the two relays 37 and 42.

Relay 37 is designed to operate very quickly, compared to the time of operation of relay 46. The operation of relay 37 causes the arms 30 and 31 to be drawn against the contacts 28 and 29 respectively, thus disconnecting said arms from the contacts 33 and 34 respectively. The bridge is now disconnected as a voltage doubler and is arranged as a straight full wave bridge rectifier. The time during which the relay 37 operates is chosen substantially smaller than the time during which the condensers 24 and 25 will discharge and drop in voltage to an amount less than the extinction voltage of the glow lamp 11. In other words, after the gaseous discharge tube has ignited, the bridge will be switched over to a straight full-wave rectifier, and before the time the voltage across the condensers 24 and 25 has dropped to a value at which the glow lamp 11 will extinguish, the switching operation is complete and power is being supplied to the circuit.

With the condensers 24 and 25 disconnected, the residual charge thereon is permitted to leak off through the resistors 35 and 36. The bridge operates in the usual manner, current one one half cycle flowing from source 70 through lead 12, terminal 14, arm 17, terminal 20, into lead 22, coil of relay 37, through the load 41, then through coil of relay 46, switch 44—43, then through lead 23, terminal 21, arm 19, terminal 15, lead 13 and back to the source 10, current on the second half cycle on reverse polarity flowing from source 10 through lead 13, terminal 15, arm 16, terminal 20, lead 22, coil of relay 37, through load 41, then through coil of relay 46, switch 44—43, then through lead 23, terminal 21, arm 18, terminal 14, lead 12, and back to source 10.

The surge of current through the circuit energizes the relay 42 and causes the arm 43 to move against the contact 44 thereby connecting the load into the circuit after the glow lamp 11 has become united and the voltage across said lamp has dropped to the operating value thereof. Thus, during the time that the voltage has been building up to the igniting value, the load 41 has not been in the circuit, and the elements thereof were not subject to the high voltage necessary to ignite the glow tube 11.

The normal position of the relay 46 being with the arm 47 bearing against the contact 48, as soon as the load 41 begins to draw current, the coil of the relay 46 will be energized, drawing the arm 47 away from the contact 48 and disconnecting the supplemental load 45 from the circuit. If at any time during the operation, the current through the load 41 should drop below a value dangerous to the glow lamp 11, i. e., at which the current through the glow lamp will be prohibitive, the relay 46 will be de-energized connecting the supplemental load 45 into the circuit to absorb excess current. The reason for this safety feature is the fact that once the glow lamp has fired, the amount of current drawn depends only upon the magnitude of the current through the current limiting resistor 49 and this current may be well over the current which the glow lamp can withstand in normal operation.

The peculiar property of gaseous discharge tubes is such that the voltage across the tube must be constant. The current which passes through the tube may vary without change of voltage. Thus the use as a stabilizer is apparent, and its use in the circuit described is in that manner. Fluctuations of the supply voltage will be compensated for by the current limiting resistor, and variations in load will not affect the value of the voltage across the glow lamp 11. Further explanation of the operation of the gaseous discharge tube and its characteristics is believed unnecessary in view of the fact that this portion of the invention is not intended to be specifically covered, and the device is well known in the art.

It should be appreciated from the above that my invention is ideally adapted for the operation of gaseous discharge tubes from low voltage A. C. sources. The presently popular fluorescent lamps used for lighting purposes are such glow lamps, and by means of my invention it is not only possible to utilize said lamps without the need for complicated auto-transformer and switch arrangements, but it is also possible to utilize such lamps without producing therein the stroboscopic effect necessarily accompanying the use of transformers and alternating voltages.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A starting and operating circuit for a gaseous discharge tube including a rectifying circuit, a voltage doubling circuit, an alternating current power source feeding both of said circuits, said tube being intially connected in said doubling circuit, and means for automatically connecting said tube into said rectifying circuit and simultaneously disconnecting it from said doubling circuit upon ignition of the tube.

2. A starting and operating circuit for a gaseous discharge tube including a rectifying circuit, a voltage doubling circuit, an alternating current power source feeding both of said circuits, said tube being initially connected in said doubling circuit, and means for automatically connecting said tube into said rectifying circuit and simultaneously disconnecting it from said doubling circuit upon ignition of the tube, said means comprising a switch device operable upon ignition of the tube.

3. A starting and operating circuit for a gaseous discharge tube including a rectifying circuit, a voltage doubling circuit, an alternating current power source feeding both of said circuits, said tube being initially connected in said doubling circuit, and means for automatically connecting said tube into said rectifying circuit and simultaneously disconnecting it from said doubling circuit upon ignition of the tube, said means comprising an electromagnetically actuated switching device in series connection with said tube and operable upon the energizing thereof by the surge of current through said tube upon the ignition thereof.

4. A starting and operating circuit for a gaseous discharge tube comprising a rectifying circuit, a voltage doubling circuit, said rectifying circuit and voltage doubling circuit adapted to be alternatively connected to a source of alternating current power, a gaseous discharge tube, means initially connecting said tube into said doubling circuit and operable to connect said tube into said rectifying circuit for successive ignition and operation thereof, whereby the voltage generated by the power source need never be greater than the operating voltage of said gaseous discharge tube.

5. A starting and operating circuit for a gaseous discharge tube comprising a rectifying circuit and a voltage doubling circuit, a source of alternating current feeding both of said circuits, said doubling circuit being adapted to supply the ignition voltage for said tube by substantially raising the voltage from the source to said ignition voltage, and said rectifying circuit being adapted to supply the operating voltage for said tube at the substantially rectified alternating quantity derived from the source, means initially connecting said tube into said doubling circuit, and means operable to simultaneously disconnect said tube from said doubling circuit and connect same into said rectifying circuit upon ignition of said tube.

6. In a stabilized rectifying circuit, a rectifying bridge circuit, a voltage doubling circuit, a source of alternating current power feeding both said bridge circuit and said doubling circuit, a load, a gaseous discharge device in parallel with said load, said gaseous discharge tube being initially connected into said doubling circuit, means operable upon ignition of the tube to automatically disconnect said gaseous discharge tube from said doubling circuit and simultaneously connect the same into said rectifying bridge circuit for supplying the normal operating voltage to said tube, said tube serving to stabilize the voltage across said load.

7. In a stabilized rectifying circuit, a rectifying bridge circuit, a voltage doubling circuit, a source of alternating current power feeding both said bridge circuit and said doubling circuit, a load, a gaseous discharge device in parallel with said load, said gaseous discharge tube being initially connected into said doubling circuit, means operable upon ignition of the tube to automatically disconnect said gaseous discharge tube from said doubling circuit and simultaneously connect the same into said rectifying bridge circuit for supplying the normal operating voltage to said tube, said tube serving to stabilize the voltage across said load, said load being initially disconnected from said gaseous discharge tube and switch means operable upon ignition of said tube for connecting said load across said tube.

8. In a stabilized rectifying circuit, a rectifying bridge circuit, a voltage doubling circuit, a source of alternating current power feeding both said bridge circuit and said doubling circuit, a load, a gaseous discharge device in parallel with said load, said gaseous discharge tube being initially connected into said doubling circuit, means operable upon ignition of the tube to automatically disconnect said gaseous discharge tube from said doubling circuit and simultaneously connect the same into said rectifying bridge circuit for supplying the normal operating voltage to said tube, said tube serving to stabilize the voltage across said load, said load being initially disconnected from said gaseous discharge tube and switch means operable upon ignition of said tube for connecting said load across said tube, said last mentioned means comprising an electromagnetically actuated switch in series connection with said gaseous discharge tube operable by the surge of current through said tube upon ignition thereof.

9. A stabilized rectifying circuit comprising a full-wave rectifying bridge, a voltage doubling circuit, said voltage doubling circuit and rectifying bridge having a pair of arms in common, a source of alternating power adapted to embrace an alternating voltage across said bridge and across said doubling circuit, a gaseous discharge tube adapted to be connected to the output of said bridge and voltage doubling circuits, and a load adapted to be connected in parallel with said gaseous discharge tube, said gaseous discharge tube being initially maintained in connection with said doubling circuit for supplying said tube with an ignition voltage, said load being initially disconnected from said gaseous discharge tube, means operable upon ignition of said gaseous discharge tube to automatically disconnect said tube from said doubling circuit and simultaneously connect said tube into said rectifying bridge circuit, said rectifying bridge circuit thereby supplying the operating voltage of said tube thereto.

10. A stabilized rectifying circuit comprising a full-wave rectifying bridge, a voltage doubling circuit, said voltage doubling circuit and rectifying bridge having a pair of arms in common, a source of alternating power adapted to embrace an alternating voltage across said bridge and across said doubling circuit, a gaseous discharge tube adapted to be connected to the output of said bridge and voltage doubling circuits, and a load adapted to be connected in parallel with said gaseous discharge tube, said gaseous discharge tube being initially maintained in connection with said doubling circuit for supplying said tube with an ignition voltage, said load being initially disconnected from said gaseous discharge tube, means operable upon ignition of said gaseous discharge tube to automatically disconnect said tube from said doubling circuit and simultaneously connect said tube into said rectifying bridge circuit, said rectifying bridge circuit thereby supplying the operating voltage of said tube thereto, and means also operable upon ignition of said tube for automatically connecting said load thereto after said gaseous discharge tube is operating.

11. A circuit for initiating and operating an electrical discharge device the initiating voltage of which is substantially greater than its operating voltage, comprising a bridge rectifier circuit and a doubling circuit having a pair of arms in common with a pair of arms of said bridge rectifier circuit, and having the D. C. terminals commonly connected to said discharge device, and means operable upon the initiation of said discharge device for automatically disconnecting said common arms from the doubler circuit and connecting them into the rectifier circuit.

12. A circuit for supplying stabilized D. C. voltage to a load, comprising a rectifier bridge, a voltage stabilizing device the initiating voltage of which is substantially greater than its operating voltage, a pair of condensers adapted to be connected in series across the D. C. terminals of said bridge, one A. C. terminal of said bridge being connected to the midpoint between the said condensers, said load and stabilizing device being connected in parallel across said D. C. terminals of said bridge, a pair of arms of said bridge being disconnected from said D. C. terminals when said condensers are connected thereto whereby said condensers and the remaining arms function as a voltage doubler, and means operable upon the initiation of said voltage stabilizing device for disconnecting said condensers from said D. C. terminals and reconnecting said pair of arms to the D. C. terminals of said bridge to cause the same to function as a rectifier.

EUGEN MITTELMANN.